(12) United States Patent
Raffalt et al.

(10) Patent No.: US 6,429,571 B2
(45) Date of Patent: Aug. 6, 2002

(54) METHOD TO CONTROL PIEZOELECTRIC DRIVES

(76) Inventors: Felix Raffalt, Am Buehlohof 10, D-77756 Hausach; Adrian Frick, Obere Bahnhofstrasse 4, D-77709 Wolfach, both of (DE)

( * ) Notice: Subject to any disclaimer, the term of this patent is extended or adjusted under 35 U.S.C. 154(b) by 0 days.

(21) Appl. No.: 09/795,044

(22) Filed: Feb. 26, 2001

(30) Foreign Application Priority Data

May 15, 2000 (DE) .......................... 100 23 306

(51) Int. Cl.⁷ .......................... H01L 41/00; G01B 13/00
(52) U.S. Cl. .................................................. 310/316.01
(58) Field of Search ..................... 310/316.01

(56) References Cited

U.S. PATENT DOCUMENTS

| | | | |
|---|---|---|---|
| 5,719,460 A | * | 2/1998 | Watarai et al. ......... 310/316.01 |
| 6,244,095 B1 | * | 6/2001 | Nozoe et al. ................. 73/1.82 |
| 6,255,760 B1 | * | 7/2001 | Hasegawa et al. ..... 310/316.01 |
| 2001/0037683 A1 | * | 11/2001 | Nozoe et al. ............. 73/504.16 |

FOREIGN PATENT DOCUMENTS

| | | | | |
|---|---|---|---|---|
| DE | 195 08 700 C1 | * | 8/1996 | .......... G01B/21/00 |
| DE | 196 21 449 | * | 1/1998 | |
| DE | 192 21 499 C2 | * | 11/2000 | .......... G01F/23/28 |

* cited by examiner

Primary Examiner—Thomas M. Dougherty
(74) Attorney, Agent, or Firm—Baker Botts L.L.P.

(57) ABSTRACT

A method for controlling piezoelectric drives in filling level measuring devices, in the case of which a piezoelectric device (7) is coupled to a fork resonator, and this piezoelectric device (7) is used to excite and detect vibrations. The excitation signal (B) is an at least approximately trapezoidal signal, as a result of which the generation of undesired harmonic resonances in the fork resonator can be effectively avoided. The excitation signal preferably comprises two phases with approximately constant maximum and minimum levels, respectively, which are interrupted in each case by a phase of defined period and defined limited rate of signal change.

21 Claims, 2 Drawing Sheets

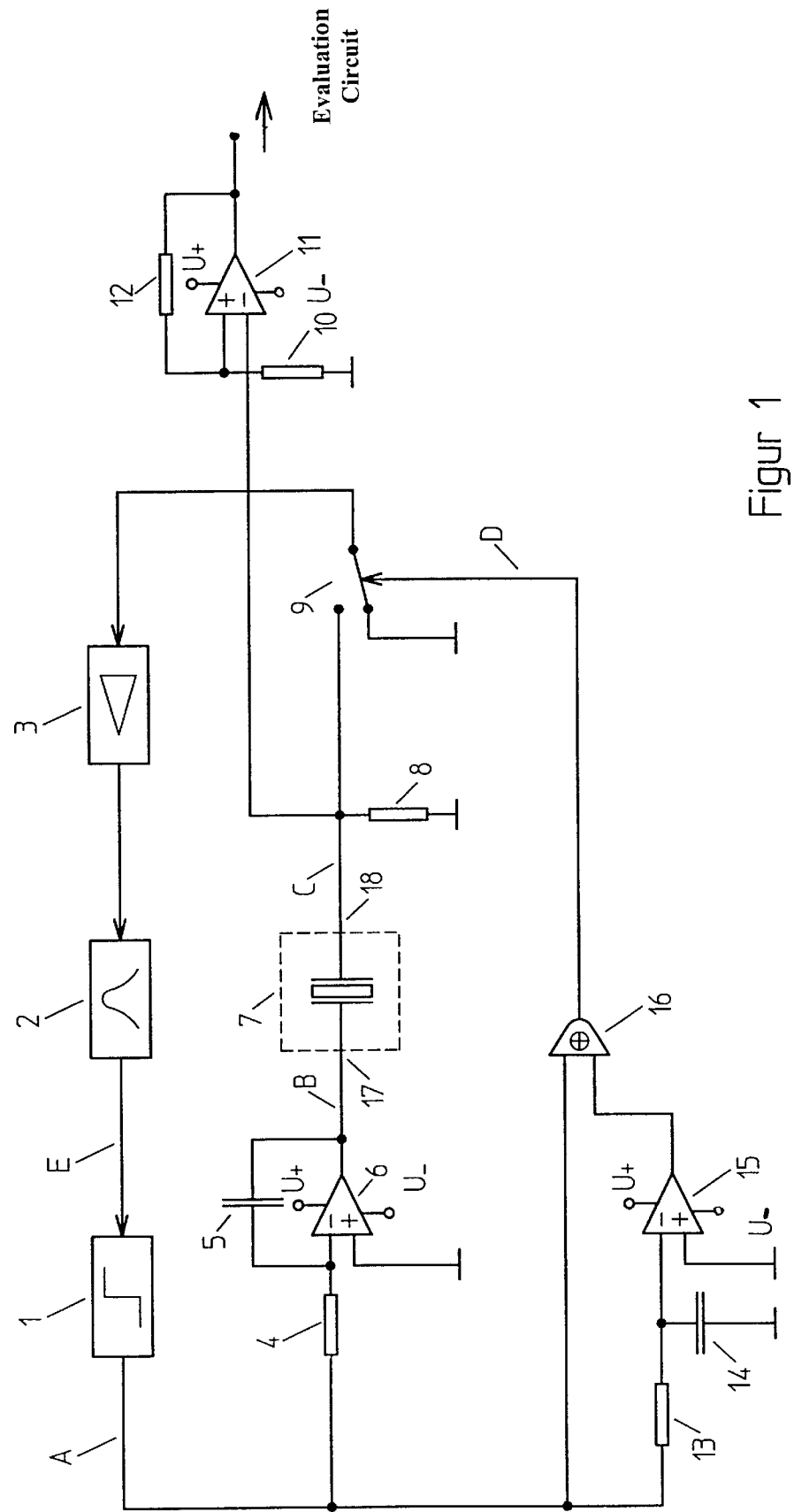
Figur 1

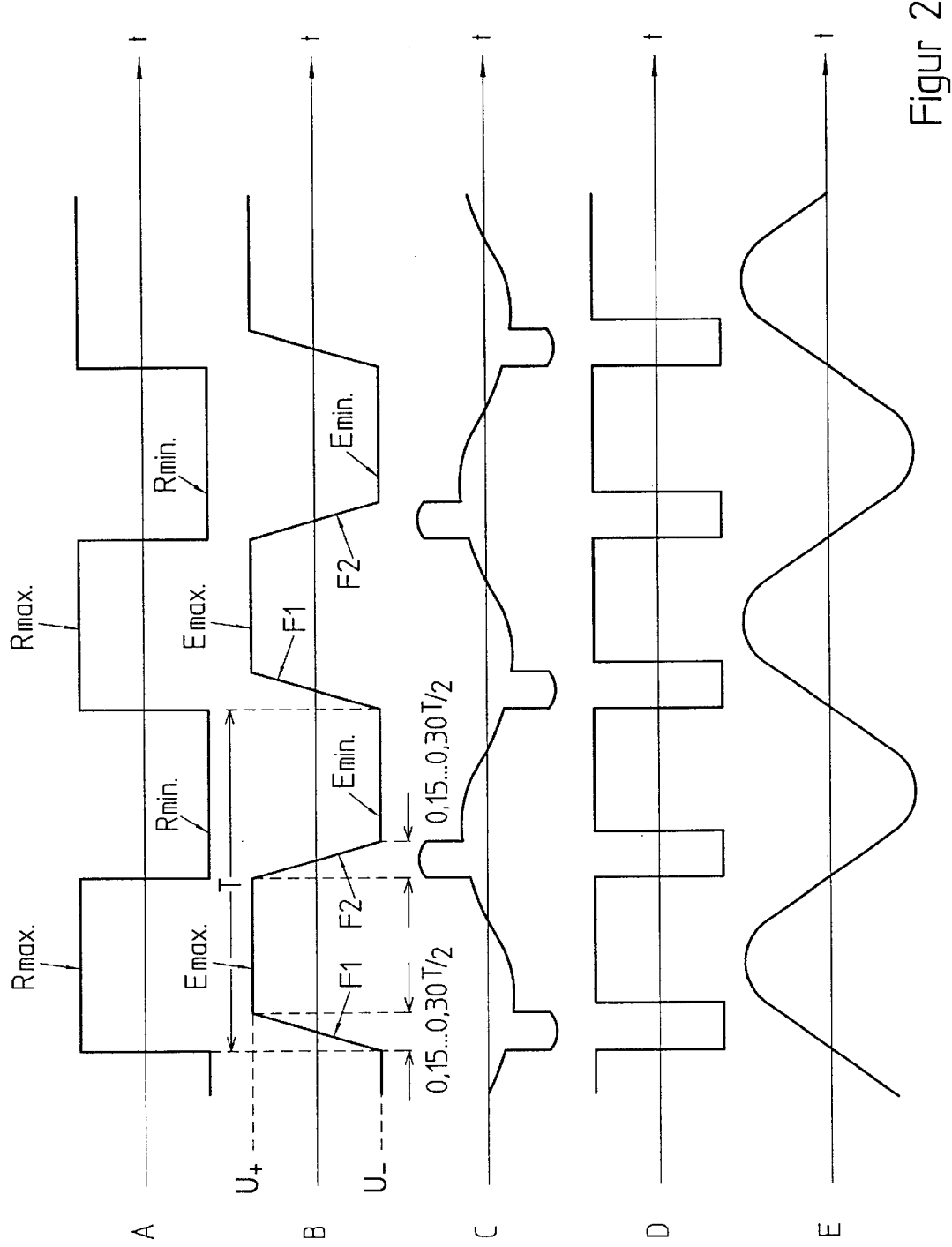
Figur 2

METHOD TO CONTROL PIEZOELECTRIC DRIVES

FIELD OF THE INVENTION

The invention relates to a method for controlling piezoelectric drives in filling level measuring devices.

Such a method is disclosed, for example, in German Patent Application DE 19 621 449 A1 in the name of the applicant. The design principle of a fork resonator is described there, and hereby incorporated by reference.

In reducing the size of tuning fork systems as far as very short fork prong lengths, the basic problem arises that in addition to the prong length the size of the remaining components must also be reduced to a corresponding extent, in order to obtain equivalent vibratory properties apart from the clearly higher frequency. While a corresponding reduction in the overall length of the piezoelectric drive unit is possible in principle, other components and parameters exist which do not change together in a suitable ratio.

Thus, for example, the diaphragm thickness is 1 mm for standard tuning forks with a prong length of approximately 100 mm. However, a diaphragm thickness of 0.4 mm would need to be targeted in the case of a tuning fork shortened to 40 mm. Since, however, a minimum material thickness of 1 mm is prescribed by statute for recognizing the diaphragm as explosion zone separation, the result is a crass disproportion between prong length and diaphragm thickness.

This problem is still further intensified in that the diameter of the central tension bolt on the diaphragm likewise cannot be reduced in size, since it would otherwise not be of sufficient tensile strength for the mechanical tensile stress applied by the drive system.

A weaker design of the drive system is, however, not possible since the diaphragm stiffness has increased owing to the constant diaphragm thickness in conjunction with a simultaneously reduced diameter. Since, in the case of a reduced diaphragm diameter, the tension bolt requires a larger area in relative terms, it leads to a further increase in the diaphragm flexural strength.

It is an undesired consequence of the diaphragm flexural strength, which is substantially too high by comparison with the fork prongs, that the fork prongs themselves take over a substantial portion of the overall flexural vibration of the vibration resonator. It is a particularly disturbing fact that, particularly in the case of a tuning fork covered by filling material, in addition to the fundamental vibrational mode vibration nodes also form on the fork prongs, with the undesired consequence of harmonic resonances.

In accordance with the prior art, a fundamental bandpass filter is fitted in the feedback oscillator which serves to excite the vibration resonator, and so the resonance circuit is reliably prevented from latching on to a harmonic. The partial formation of harmonic vibration nodes cannot, however, be excluded in this way, the result being a negative influence on the fundamental vibration.

The harmonic vibrations which occur have the effect that as the tuning fork dips into and out of the filling material the vibrational frequency changes not continuously but suddenly, with the formation of a hysteresis. In the case of viscous filling materials, it is even possible for the frequency profile to be inverted, since with increasing covering by filling material the influence of harmonic resonances grows. When the tuning fork dips into the filling material the frequency firstly drops—as desired—but with increasing cover there is then a rise in frequency under the influence of the high-frequency harmonics which, in the case of a completely covered tuning fork, can lead to a frequency value such as corresponds to an uncovered fork. If the fundamental bandpass filter is tuned lower, the problem arises that the fork resonator no longer starts to vibrate automatically when the power supply is switched on.

In the known solutions, a rectangular signal is used to control the piezoelectric element. However, since the rectangular signal has a very strong harmonic content in addition to the fundamental, harmonic resonances which are present, but undesired, in the fork resonator are excited.

The use of a harmonic-free sinusoidal excitation signal would certainly solve the problem theoretical, but in practice it is exceptionally complicated in terms of circuitry and very unfavourable in terms of energy. In addition to the power consumption of the sinusoidal generator, which can be controlled by frequency and phase in a variable fashion, sinusoidal output stages have a poor efficiency in principle and require a supply voltage which is increased by $\sqrt{2}$ so that a sinusoidal output signal of the same voltage-time area as a rectangular signal is generated. Furthermore, no method is known at present which permits the electronic separation of drive signal and detection signal in the case of sinusoidal excitation.

SUMMARY OF THE INVENTION

It is therefore the object of the method according to the invention to specify a method for controlling a piezoelectric drive in filling level measuring devices which, in conjunction with a minimum outlay on components and energy as well as the possibility of simultaneous use of a piezoelectric element for exciting and detecting vibrations, permits the fork resonator to be excited in a fashion attended by few harmonics.

This object is achieved by means of the features of claim 1. Developments of the invention are the subject matter of the dependent claims.

Thus, the method according to the invention achieves the object by virtue of the fact that an at least approximately trapezoidal signal is generated as excitation signal. The excitation signal can comprise, for example, two phases with approximately constant high or low potential which are interrupted by in each case a phase of defined period and a rate of signal change which is limited in a defined fashion. Use is preferably made for this purpose of a rail-to-rail integrator driven to the limit.

BRIEF DESCRIPTION OF THE DRAWINGS

The method according to the invention is explained with the aid of an exemplary embodiment in conjunction with two figures, in which:

FIG. 1 shows a block diagram of a vibration filling level limit switch according to the invention, and FIG. 2 shows the time profile of a plurality of signals of the circuit illustrated in FIG. 1.

DETAILED DESCRIPTION OF THE EMBODIMENTS

In the following exemplary embodiment of FIG. 1, a single piezoelectric element is shown as excitation and detection element. However, this can be replaced by a similarly acting transducer (for example a plurality of piezoelectric elements, inductive transducers or the like).

The block diagram, illustrated by way of example in FIG. 1, of a vibration filling level limit switch has an amplifier device 1, 2, 3 in whose feedback circuit a transducer device 7, preferably a piezoelectric transducer device, is connected. In detail, the amplifier device comprises an amplifier 3 with a downstream fundamental bandpass filter 2 and a downstream zero crossing detector 1, respectively a square-wave generator stage 1. The input of an integrator is connected with the output of the zero crossing detector 1. This integrator has an operational amplifier 6. The non-inverting input of this operational amplifier 6 is connected to reference potential. The inverting input is firstly connected to the output of the operational amplifier 6 via a capacitor 5, and secondly connected to the output of the zero crossing detector 1 via a resistor 4. The output of the operational amplifier 6 of the integrator is connected to one pole of the transducer device 7 via a supply lead 17. The other pole of the transducer device 7 is connected to one terminal of a resistor 8 via a supply lead 18. The other terminal of the resistor 8 is at reference potential. The connecting point between the resistor 8 and the supply lead 18 is, moreover, connected to one input terminal of a changeover switch 9. A further input terminal of the changeover switch 9 is at reference potential. The output terminal of the changeover switch 9 is in contact with the input of the amplifier 3. The changeover switch 9 is switched over by a control signal D that is tapped at the output of an EXOR gate 16. A first input of this EXOR gate is connected to the output of the zero crossing detector 1 and, simultaneously, to the free terminal, not connected to the operational amplifier 6, of the resistor 4. A second input of the EXOR gate 16 is connected to the output of a comparator 15 whose non-inverting input is at reference potential and whose inverting input is likewise connected to the output of the zero crossing detector 1 via a resistor 13. A capacitor 14 is connected between reference potential and the inverting input of the operational amplifier 15 or comparator 15.

In addition, the line 18 is connected to a comparator 11, which is affected by hystereses, said connection being effected by the line 18 being in contact with the inverting input of the comparator 11. The non-inverting input of this comparator 11 is firstly connected to reference potential via a resistor 10, and secondly connected to the output of the comparator 11 via a further resistor 12. The output of the comparator 11 is connected to a frequency evaluation stage 20. The frequency evaluation stage 20 generates an optical and/or acoustic interference alarm signal when, in a way still to be explained below, it is established that the transducer device 7 is not correctly connected, or that there is a line defect in the circuit arrangement illustrated in FIG. 1.

The following functional sequence arises for the circuit shown in FIG. 1.

The vibration detection signal amplified by the input amplifier 3 is fed to the fundamental bandpass filter 2 which generates the filtered and phase-corrected, approximately sinusoidal intermediate signal E. The latter is converted by the zero crossing detector 1 into a rectangular signal A. In known sensors, this signal A would be used as excitation signal for the piezoelectric element 7.

The signal A is fed for the purpose of reducing its harmonic content to an integrator 4, 5, 6 which generates the trapezoidal signal B. The integration time constant is selected by means of the components 4, 5 in such a way that, after 15 to 30%, preferably approximately 25%, of the half period T/2 of the signal A, the operational amplifier 6 reaches its maximum or minimum final value Emax, Emin. Since the operational amplifier 6 preferably has a rail-to-rail output stage, these values respectively correspond to the positive and/or negative operating voltage U-, U. The signal B therefore reaches the full operational voltage range and, owing to the integration operation, has an edge steepness defined by means of the resistor 4 and capacitor 5. By contrast with the rectangular signal A, the trapezoidal signal B is greatly reduced in harmonics, such that an only slight mechanical harmonic component is excited in the piezoelectric vibration element 7.

The voltage-time area of the signal B is certainly somewhat reduced by comparison with that of the rectangular signal A, but substantially greater than in the case of a sinusoidal signal. By comparison with a sinusoidal signal, for the same supply voltage the signal B permits an advantageously higher excitation power.

The current flow through the piezoelectric element 7 is measured at the measuring shunt 8. It is composed of the charge-reversal current, caused by the excitation signal, of the piezoelectric element 7, and by the piezoelectric charging quanta generated on the basis of the mechanical fork resonator vibration. The signal C shows the superposition of the two current components. The separation of the vibration detection signal and operating signal is performed by means of the changeover switch 9. It blanks out the undesired charge-reversal current in the detection signal in accordance with a control signal D by connecting the signal input of the input amplifier 3 to a frame potential during the time of the charge-reversal phase. The control signal B required for this purpose is derived from the signal A by using the resistor 13, capacitor 14 and comparator 15 to generate an inverted auxiliary signal which is phase-shifted relative to A and produces the signal D at the EXOR gate 16 by exclusive ORing with the signal A. The low phase of the control signal D defines the time of the signal blanking and is always selected to be somewhat longer than the rising or falling signal phase in signal B.

The signals B and C are transmitted to the piezoelectric element 7 by means of lines 17, 18. If one of these lines is disconnected from the electronics, the oscillator vibration is interrupted, and this is detected by the downstream electronic evaluation system as a fault state. If the interruption occurs on the piezoelectric side, however, then starting from a certain cable length of the lines 17, 18 the oscillator continues to vibrate, since it remains in feedback owing to the remaining cable capacitance.

The vibrational frequency is a function of the remaining cable length and of the electromagnetic parasitics, and may be in the range of nominal operating of the tuning fork, and so the defect may not be detected by the downstream frequency evaluation electronics, as the case may be.

In order to monitor the functioning of the piezoelectric element supply leads 17, 18, the capacitance between them is measured simultaneously during the vibration process.

The piezoelectric capacitance is typically approximately 2 nF, and the cable capacitance is typically at most approximately 0.5 nF. It is therefore clearly possible to use the capacitance ce value to distinguish whether the piezoelectric element is connected.

For this purpose, the signal C containing the piezoelectric charge-reversal currents and which is tapped at the measuring shunt 8 is evaluated by means of a comparator 10, 11, 12, which is subject to hystereses. The resistors 10, 12 lend the comparator 11 a switching hysteresis which is symmetrical relative to frame potential. During the rising or falling signal phase of B, voltage amplitudes occur at the measuring shunt 8 which are proportional to the rate of signal rise of signal B and the total capacitance of the piezoelectric element 7 and lines 17, 18. The switching hysteresis of the comparator 11 is selected to be so large that the capacitance of the lines 17, 18 cannot effect switching over of the comparator 11, whereas with the piezoelectric capacitor connected the comparator 11 flips into the inverted position in each case when signal B changes edge. The result at the output of the comparator 11 is a signal which, apart from differences in propagation time, corresponds to the signal A, and is fed to a fault evaluation unit not illustrated in more detail.

The input of the frequency evaluation stage is not now, as would correspond to the prior art, connected to the signal A, rather to the output signal of the comparator 11. An interruption in the piezoelectric circuit therefore results in that the vibration failure monitor responds in the frequency evaluation stage.

Since the normal measurement signal runs through the comparator circuit 10, 11, 12 and the measuring shunt 8 permanently, it is impossible not to notice failure of this circuit part. Suitability in terms of TÜV requirement category 3 is therefore obtained.

Whereas only indirect checking of the supply of power to the piezoelectric element takes place in the case of circuit monitoring methods by means of parallel resistors or feedback lines, the method described permits direct monitoring of the piezoelectric element for physical presence in the circuit by measuring the capacitance of the piezoelectric element.

FIG. 1 illustrates a practical exemplary embodiment of an arrangement in which a piezoelectric element is excited electrically with few harmonics, a detection signal for the mechanical vibration is derived by the same piezoelectric element with the aid of the piezoelectrically generated charge quanta, and the self-capacitance is measured by the same piezoelectric element during the vibration process.

Exciting the piezoelectric element with few harmonics can, of course, also be employed without the line breakage detection described in the exemplary embodiment. Moreover, it is also possible to employ a plurality of piezoelectric elements instead of a single piezoelectric element. Finally, excitation with few harmonics is also possible wherever one or more piezoelectric elements are employed exclusively to excite vibrations.

We claim:

1. A method for controlling piezoelectric drives in filling level measuring devices, in which a piezoelectric device is coupled to a fork resonator and, comprising the steps of:
   applying an excitation signal to the piezoelectric device for the purpose of exciting vibrations; and
   detecting vibrations using the piezoelectric device, wherein the excitation signal is a signal having at least an approximately trapezoidal profile.

2. Method according to claim 1, wherein the maximum level and the minimum level of the trapezoidal excitation signal correspond to the maximum and minimum levels of an operating voltage supplying the piezoelectric drive.

3. Method according to claim 1, wherein the falling and rising edges of the trapezoidal excitation signal have at least approximately equal gradient in terms of absolute value.

4. Method according to one of claim 1, wherein the falling and rising edges correspond to approximately 0.15 to 0.30, preferably approximately 0.25, of a half-period of the trapezoidal excitation signal.

5. Method according to one of claim 1, wherein the trapezoidal excitation signal is tapped at the output of an integrator device whose input is fed a rectangular signal.

6. Method according to claim 5, wherein the integrator device is a rail-to-rail integrator.

7. Method according to claim 5, wherein the rectangular signal has maximum and minimum levels of at least approximately equal length.

8. Method according to one of claim 1, wherein the trapezoidal excitation signal and the rectangular signal are symmetrical.

9. Method according to one of claim 1, wherein the trapezoidal excitation signal is fed to a single piezoelectric element of the piezoelectric device and this piezoelectric element is used both to excite vibrations and to detect vibrations.

10. Method according to claim 6, wherein the rectangular signal has maximum and minimum levels of at least approximately equal length.

11. Method according to one of claim 1, wherein the trapezoidal excitation signal or the rectangular signal is symmetrical.

12. An arrangement for controlling piezoelectric drives in filling level measuring devices comprising:
   a piezoelectric device which is coupled to a fork resonator,
   a signal generator generating an excitation signal applied to the piezoelectric device for the purpose of exciting vibrations, wherein the excitation signal is a signal having at least an approximately trapezoidal profile,
   a detector circuitry for detecting the vibrations.

13. Arrangement according to claim 12, wherein the maximum level and the minimum level of the trapezoidal excitation signal correspond to the maximum and minimum levels of an operating voltage supplying the piezoelectric drive.

14. Arrangement according to claim 12, wherein the falling and rising edges of the trapezoidal excitation signal have at least approximately equal gradient in terms of absolute value.

15. Arrangement according to one of claim 12, wherein the falling and rising edges correspond to approximately 0.15 to 0.30, preferably approximately 0.25, of a half-period of the trapezoidal excitation signal.

16. Arrangement according to one of claim 12, wherein the signal generator comprises square wave generator coupled with an integrator device and wherein the trapezoidal excitation signal is tapped at the output of an integrator device whose input is fed a rectangular signal from the square generator.

17. Arrangement according to claim 16, wherein the integrator device is a rail-to-rail integrator.

18. Arrangement according to claim 16, wherein the rectangular signal has maximum and minimum levels of at least approximately equal length.

19. Arrangement according to one of claim 12, wherein the trapezoidal excitation signal and/or the rectangular signal are symmetrical.

20. Arrangement according to one of claim 12, wherein the trapezoidal excitation signal is fed to a single piezoelectric element of the piezoelectric device and this piezoelectric element is used both to excite vibrations and to detect vibrations.

21. Arrangement according to claim 16, further comprising a switch for coupling a control input of the square wave generator with either ground or the piezoelectric device, wherein the switch is controlled by a zero crossing detection unit coupled with the square wave generator.

* * * * *